United States Patent
Stamires et al.

(10) Patent No.: US 10,457,873 B2
(45) Date of Patent: Oct. 29, 2019

(54) PROCESS FOR PRODUCING HIGH QUALITY BIO-OIL IN HIGH YIELD

(75) Inventors: Dennis Stamires, Dana Point, CA (US); Michael Brady, Studio City, CA (US); Paul O'Connor, Hoevelaken (NL); Jacobus Cornelis Rasser, Redondo Beach, CA (US)

(73) Assignee: Inaeris Technologies, LLC, Pasadena, TX (US)

( * ) Notice: Subject to any disclaimer, the term of this patent is extended or adjusted under 35 U.S.C. 154(b) by 1022 days.

(21) Appl. No.: 13/259,233

(22) PCT Filed: Mar. 24, 2010

(86) PCT No.: PCT/US2010/028511
§ 371 (c)(1),
(2), (4) Date: Feb. 27, 2012

(87) PCT Pub. No.: WO2010/111396
PCT Pub. Date: Sep. 30, 2010

(65) Prior Publication Data
US 2012/0144730 A1  Jun. 14, 2012

Related U.S. Application Data

(60) Provisional application No. 61/162,729, filed on Mar. 24, 2009, provisional application No. 61/162,734, filed on Mar. 24, 2009.

(51) Int. Cl.
*C10B 47/00* (2006.01)
*C10B 53/02* (2006.01)
(Continued)

(52) U.S. Cl.
CPC .............. *C10B 53/02* (2013.01); *C10B 49/16* (2013.01); *C10B 57/08* (2013.01); *C10C 5/00* (2013.01);
(Continued)

(58) Field of Classification Search
CPC .. C10G 2300/1011; C10G 21/00; C10B 47/00
See application file for complete search history.

(56) References Cited

U.S. PATENT DOCUMENTS 4,300,009 A * 11/1981 Haag et al. .................. 585/408
5,395,455 A *  3/1995 Scott et al. ..................... 127/37
(Continued)

FOREIGN PATENT DOCUMENTS

CN       1385508 A    12/2002
CN       1800307 A     7/2006
(Continued)

OTHER PUBLICATIONS

Brown et al. "Strategies for pyrolytic conversion of herbaceous biomass to fermentation products" 2000, Northeast Regional Biomass Program: Ninth Biennial Bioenergy Conference, p. 1-10.*
(Continued)

*Primary Examiner* — Ellen M McAvoy
*Assistant Examiner* — Ming Cheung Po
(74) *Attorney, Agent, or Firm* — Hovey Williams LLP

(57) ABSTRACT

A process is disclosed for converting a particulate solid biomass material to a high quality bio-oil in high yield. The process comprises a pretreatment step and a pyrolysis step. The pretreatment comprises a step of at least partially demineralizing the solid biomass, and improving the accessibility of the solid biomass by opening the texture of the particles of the solid biomass. In a preferred embodiment the liquid pyrolysis product is separated into the bio-oil and an aqueous phase, and the aqueous phase is used as a solvent in the demineralization step and/or in the step of improving the accessibility of the solid biomass by opening the texture of the particles of the solid biomass.

25 Claims, 2 Drawing Sheets

(51) Int. Cl.
| | |
|---|---|
| C10B 49/16 | (2006.01) |
| C10B 57/08 | (2006.01) |
| C10C 5/00 | (2006.01) |
| C10L 1/02 | (2006.01) |
| C10L 9/02 | (2006.01) |
| C10G 1/00 | (2006.01) |
| C10G 1/02 | (2006.01) |

(52) U.S. Cl.
CPC ............... *C10G 1/00* (2013.01); *C10G 1/02* (2013.01); *C10L 1/02* (2013.01); *C10L 9/02* (2013.01); *C10G 2300/1014* (2013.01); *C10G 2300/203* (2013.01); *C10G 2300/44* (2013.01); *Y02E 50/14* (2013.01); *Y02P 30/20* (2015.11)

(56) References Cited

U.S. PATENT DOCUMENTS

| | | | | |
|---|---|---|---|---|
| 6,814,940 | B1 * | 11/2004 | Hiltunen | B01J 8/0055 422/140 |
| 7,452,392 | B2 * | 11/2008 | Nick | C10J 3/08 422/232 |
| 7,503,981 | B2 * | 3/2009 | Wyman | C12P 7/10 127/36 |
| 8,552,233 | B2 * | 10/2013 | Stamires et al. | 585/14 |
| 2012/0022307 | A1 * | 1/2012 | Yanik et al. | 585/240 |

FOREIGN PATENT DOCUMENTS

| | | | | | |
|---|---|---|---|---|---|
| EP | 1852490 | A1 | * | 11/2007 | C10B 53/02 |
| EP | 1852490 | A1 | * | 11/2007 | C10B 53/02 |
| EP | 2105486 | A1 | * | 9/2009 | C10B 53/02 |
| EP | 2105486 | A1 | * | 9/2009 | C10B 53/02 |
| EP | 2105486 | A1 | * | 9/2009 | C10B 53/02 |
| GB | 1294073 | A | * | 10/1972 | |
| WO | 2007/128800 | A1 | | 11/2007 | |
| WO | WO2007128800 | | * | 11/2007 | |
| WO | WO 2007128800 | A1 | * | 11/2007 | C10G 1/006 |
| WO | WO-2007128800 | A1 | * | 11/2007 | C10G 1/006 |
| WO | WO2007128800 | A1 | * | 11/2007 | C10G 1/006 |

OTHER PUBLICATIONS

Bourke "Preparation and properties of natural, demineralized, pure and doped carbons from biomass" Model of the Chemical Structure of Carbonized Charcoal 2006.*

Bourke "Preparation and properties of natural, demineralized, pure and ddoped carbons from biomass" Model of the Chemical Structure of Carbonized Charcoal 2006.*

Bourke "Preparation and properties of natural, demineralized, prue and doped carbons from biomass" MOdel of the Chemical Structure of Carbonized Charcoal 2006.*

Bourke "Preparation and properties of natural, demineralized, pure and dope carbons from biomass" Model of the Chemical Structure of Carbonized Charcoal 2006.*

Bourke "Preparation and properties of natural, demineralized, pure, and dope carbons from biomass." Model of the Chermical Structure Carbonized Charcoal (Year: 2006).*

Bourke (Preparation and properties of natural, demineralized, pure and doped carbons from biomass Model of the Chemical Structure of Carbonized Charcoal). (Year: 2006).*

Chinese Office Action for related Chinese Patent Application No. 201080014046.9; Applicant: KiOR, Inc.; dated Sep. 2, 2013; 9 pages.

Paul T. Williams and Patrick A. Horne; The influence of catalyst regeneration on the composition of zeolite-upgraded biomass pyrolysis oils; Fuel vol. 74 No. 12, pp. 1839-1851, Copyright 1995 Elsevier Science Ltd, Printed in Great Britain.

International Search Report and Written Opinion for co-pending PCT Application No. PCT/US2010/028511, filed Mar. 24, 2010; Dated May 10, 2010; 7 pages.

Brown et al.; Strategies for pyrolytic conversion of herbaceous biomass to fermentation products; 2000; Northeast Regional Biomass Program: Ninth Biennial Bioenergy Conference, pp. 1-10; Apr. 26, 2010 from http://www.nrbp.ort/events/bioenergy2000/bio2000_toc.pdr and from http://www.nrbp.org/papers/014.pdf.

Bourke; Preparation and Properties of Natural, Demineralized, Pure, and Doped Carbons from Biomass; Model of the Chemical Structure of Carbonized Charcoal, 2006, Apr. 26, 2010 from http://researchcommons.waikato.ac.nz/bitstream/10289/2330/1/thesis.pdf, 215 pages.

Chinese Office Action for related Chinese Patent Application No. 201080014046.9; Applicant: KiOR, Inc.; Dated Apr. 14, 2014; 11 pages.

Canadian Official Action dated Apr. 6, 2016 for related Canadian Patent Application No. 2,754,165, 4 pages.

* cited by examiner

PROCESS FOR PRODUCING HIGH QUALITY BIO-OIL IN HIGH YIELD

RELATED APPLICATIONS

This application is the national stage entry of International Application No. PCT/US10/28511, filed on Mar. 24, 2010, which claims the benefit of U.S. Provisional Application No. 61/162,729, filed on Mar. 24, 2009, and U.S. Provisional Application No. 61/162,734, filed Mar. 24, 2009, the entirety of each of the foregoing applications is hereby incorporated herein by reference.

BACKGROUND OF THE INVENTION

1. Field of the Invention

The invention relates generally to a process for converting a particulate solid biomass material to a high quality bio-oil in high yield, and more particularly to a pretreatment process in which the solid biomass material is at least partially demineralized and whereby the accessibility of the biomass material is enhanced.

2. Description of the Related Art

Processes for converting biomass material to liquid reaction products are known. Flash pyrolysis is generally recognized as providing a high yield of liquid pyrolysis products.

The quality of product obtained with flash pyrolysis tends to be poor, as evidenced by the high oxygen content and the high total acid number of such products. As a result of the high oxygen content, the pyrolysis oil does not spontaneously separate into an aqueous phase and an oil phase. Moreover, due to the high acid content, the products are highly corrosive and require to be stored and treated in equipment made of special alloys.

It is generally recognized that minerals present in solid biomass materials affect the product yields of pyrolysis conversion reactions. It has been shown in academic papers that removal of minerals from solid biomass materials results in a higher liquid yield at the expense of the coke yield and the gas yield.

Processes used in the literature to remove minerals from solid biomass are not suitable for operation on an economic scale. For example, HCl and sulfuric acid have been proposed as solvents for extracting minerals from biomass materials. Use of these mineral acids makes the process expensive and requires cumbersome recovery processes. Moreover, the use of strong acids results in hydrolysis of hemicellulose, and hence a loss of valuable carbon from the feedstock.

Sodium hydroxide has been proposed as well. Alkaline solutions however are known to solubilize lignin. Indeed, alkaline solutions are used in the Kraft process for removing lignin from papermaking cellulose fibers. Therefore, the use of sodium hydroxide also results in a significant loss of valuable carbon from the feedstock.

Thus, there is a particular need for a process for the mineralization of solid biomass material that utilizes readily available low-cost solvents and does not result in an unnecessary loss of carbon from the biomass feedstock.

BRIEF SUMMARY OF THE INVENTION

The present invention addresses these problems by providing a process for converting a particulate solid biomass material to a high quality bio-oil in high yield, said process comprising a pretreatment step and a pyrolysis step, the pretreatment step comprising
(i) at least partially demineralizing the solid biomass; and or
(ii) improving the accessibility of the solid biomass by opening the texture of the biomass particles.

Another aspect of the invention comprises a method for producing a bio-oil having a Total Acid Number of less than 30.

DETAILED DESCRIPTION OF THE INVENTION

Figure 1:
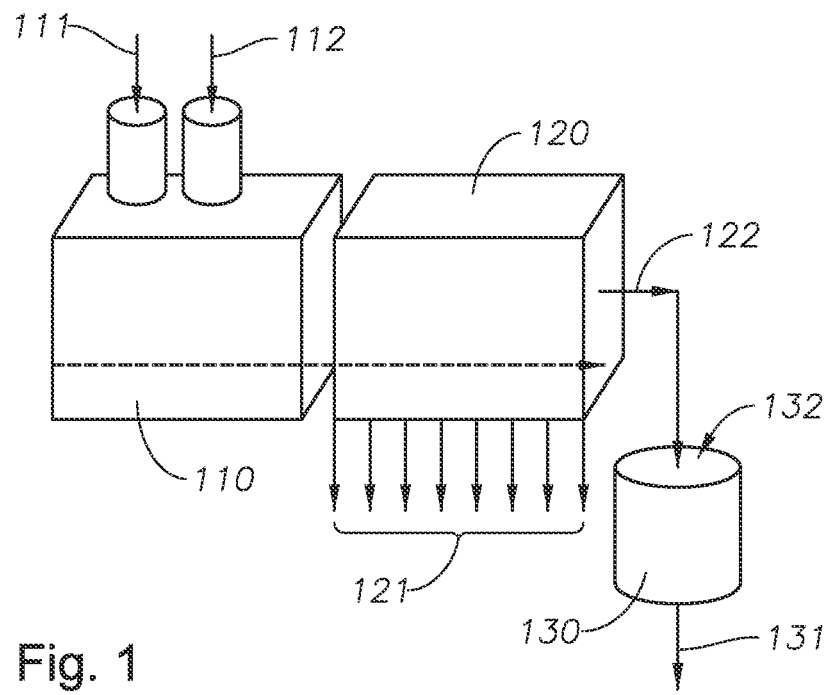
FIG. 1 is a schematic representation of a first embodiment of the process of the invention.

It is generally recognized that minerals naturally present in biomass material may have a catalytic effect in the pyrolysis reaction of the biomass. Potassium, which is one of the predominant minerals in many types of solid biomass, is believed to increase the char yield at the expense of the liquid yield. Experiments on laboratory scale confirm that a complete removal of minerals from the biomass feedstock results in a higher liquid yield and a lower char yield.

It is, however, not economically feasible to subject biomass feedstock to a complete demineralization prior to pyrolysis. An important aspect of the present invention is the discovery that partial demineralization is sufficient to obtain the desired improvement in liquid yield, and that this can be accomplished using an inexpensive extraction solvent which is readily available at a biomass conversion facility.

Removal of the minerals from the biomass feedstock reduces the reactivity of the biomass feedstock in the pyrolysis reaction. To make up for this loss of reactivity, the accessibility of the solid biomass material can be improved by opening the texture of the biomass particles.

Accordingly, the present invention relates to a process for converting a particulate solid biomass material to a high quality bio-oil in high yield, said process comprising a pretreatment step and a pyrolysis step, the pretreatment step comprising (i) at least partially demineralizing the solid biomass; and/or (ii) improving the accessibility of the solid biomass by opening the texture of the biomass particles.

Suitably, the solid biomass material is a material comprising cellulose. Particularly preferred are biomass materials that are lignocellulosic, as such materials are available at low cost. Lignocellulosic materials are not generally suitable for human consumption, and their use as a feedstock for making bio oil therefore does not interfere with the food supply.

A suitable example of the demineralization step is one comprising contacting the particulate solid biomass material with a solvent so as to dissolve at least part of the minerals present in the solid biomass material, and at least partially removing a solvent.

A preferred solvent for use in the demineralization step is an aqueous solvent, because of its low cost and its ease of handling. Water is an example of a suitable aqueous solvent. If water is used, it should preferably have a low mineral content so as to increase its demineralization properties.

Preferably, the solvent has a pH of less than 7. It has been found that an acidic pH helps mobilize the minerals present in the biomass material. Accordingly, the aqueous solvent may comprise a mineral acid. The disadvantage of using a mineral acid is that it introduces new minerals into the demineralization process. Preferably, therefore, the solvent comprises an organic acid. Even though the organic acids are weak acids, it has been found that organic acids are very effective at removing minerals from biomass. Moreover, as will be explained herein below, organic acids tend to be abundantly available in biomass conversion facilities.

It may be desirable to add a chelant to the solvent to help solubilize certain minerals, in particular transition metals, such as iron. An example of a suitable chelant is citric acid, which of course also serves as an organic acid, in addition to its chelating properties. Another suitable example of a chelant is a phosphate.

The use of a chelant considerably adds to the cost of the solvent. The extra cost may be economically justified if the biomass material has high levels of transition metals, and the use of a chelant considerably increases the liquid yield. The cost of the chelant may also be justified if it can be recovered from the pyrolysis reaction product. For example, ashes from the pyrolysis reaction may be recovered for use as fertilizer. If phosphate is used as a chelant, its presence in the ashes after the pyrolysis reaction adds to the value of the fertilizer byproduct. In most cases, however, the use of a chelant is not economically attractive.

In a preferred embodiment of the invention, the solvent comprises acidic pyrolysis products of the solid biomass material. Pyrolysis of solid biomass material, in particular lignocellulosic biomass material, produces a significant amount of water soluble organic acids, in particular acetic acid. It has been found that these acids are particularly suitable for demineralization of the biomass. Being acids, they help mobilize the minerals in the biomass material. Being buffers, they maintain a low pH even as the solvent becomes loaded with minerals; and possessing carboxyl groups, these acids have a chelating effect. On this point, the pyrolysis step results in the production of a liquid reaction product comprising an aqueous phase and an organophilic phase. The aqueous phase can be isolated from the liquid reaction product and at least a portion of the aqueous phase can be recycled to the pretreatment step for use as the solvent in the demineralizing of the solid biomass of step (i), and/or in improving the accessibility of the solid biomass by opening the texture of the particles of the solid biomass in step (ii).

The demineralization step itself comprises contacting the biomass material with the aqueous solvent in a way that the minerals present in the biomass become dissolved in the solvent; and subsequently removing at least part of the solvent. It will be appreciated that the removal of the solvent by evaporation is not conducive to mineral removal. Instead, the solvent must be removed in its liquid form. This can be accomplished by any means known in the art for liquid/solid separation. For example, particles of the solid biomass material may be mixed with the solvent to form a slurry. The solvent used in a slurry with the solid biomass preferably comprises water and an acid comprising, consisting of, or consisting essentially of an organic acid, such as those present in the aqueous phase from the liquid reaction product. The solvent used for demineralization of the solid biomass in a non-slurry system (such as soaking or filtering) preferably comprises water and also comprises, consists of, or consists essentially of an acid selected from the group consisting of citric acid, phosphoric acid, and mixtures thereof. After a contact time sufficiently long to effect extraction of minerals from the solid biomass material (generally, from about 15 minutes to several hours) the slurry may be spread on a foraminous screen, and the solvent allowed to drain out by gravity.

Preferably, however, the biomass material is allowed to swell with the solvent, after which the solvent is squeezed out by mechanical action. Mechanical action may comprise pressing the swollen of material in a filter press or in a kneader.

It may be desirable to repeat the mineral removal step once, or even several times. Although the repeat steps show a diminished return in terms of mineral removal, it has been found that such steps contribute to the desired opening of the texture of the solid biomass material, which is important for the conversion yield of the subsequent pyrolysis reaction.

Mineral removal is improved if the solvent is contacted with the solid biomass material at an elevated temperature. Suitable temperatures are in the range of from 40 to 95° C. It will be appreciated that at these temperatures carbon components of the biomass material, such as hemicellulose, may partially be removed as well. In most cases, however, the loss in hemicellulose material is small, whereas the gain in additional mineral removal due to the increased temperature is significant.

Although the process of the invention is effective in removing minerals from the solid biomass material, the mineral removal is far from complete. It has been found that several minerals, such as calcium and silicon, are tightly embedded within the biomass structure and do not become mobilized under the relatively mild conditions of the demineralization treatment. However, it has also been found that calcium and silicon do not have a major catalytic effect on the subsequent pyrolysis reaction. Other minerals, such as potassium and boron, both of which have a significant catalytic effect on the pyrolysis reaction, are removed from the biomass material to a significant extent. For example, the demineralization treatment of the process of the invention results in a removal of 40% of the native potassium, preferably at least 50%, and more preferably at least 60%. Likewise, the demineralization treatment of the process of the invention results in removal of 40% of the native boron, preferably at least 50%, and more preferably at least 60%. Thus, the process of the invention provides an economically attractive compromise between the cost of the mineral removal step and the successful removal of significant quantities of those minerals that are believed to be most harmful to the liquid yield of the subsequent pyrolysis reaction.

Even though the demineralization step itself contributes to the opening of the texture of the biomass particles, it is desirable to take additional steps to further improve the accessibility of the solid biomass A very effective way of improving the accessibility of the solid biomass comprises contacting the solid biomass with a fluid under pressure, and subsequently releasing the pressure. Upon contacting the solid biomass with the fluid, the fluid penetrates pores and cavities in the biomass material. Upon release of the pressure, the fluid rapidly migrates to the surface of the biomass particle, thereby rupturing the structure of the particle.

In a preferred embodiment the biomass is contacted with the fluid at a temperature above the boiling point of the fluid. Upon release of the pressure, the fluid rapidly evaporates.

Build-up of vapor pressure of the fluid within the biomass particles results in a very effective disruption of the texture of the particle. This technique is sometimes referred to as solvent explosion. Examples of suitable fluids for solvent explosion include water, ammonia, and supercritical carbon dioxide.

Another effective step for improving the accessibility of the solid biomass material comprises heating the solid biomass to a temperature in the range of from 60 to 300° C. Preferably the heating is carried out in an oxygen-poor or substantially oxygen free atmosphere. The term "oxygen-poor" refers to an atmosphere containing less oxygen than ambient air. In one embodiment the heating is carried out at a temperature in the range of from 110 to 300° C. This heat treatment is sometimes referred to as torrefaction, which generally refers to a temperature in the range of 200 to 300° C. We have found that torrefaction at a lower temperature, in the range of from 110 to 200° C., can be very effective in improving accessibility of the solid biomass material. We refer to this treatment as "toasting".

In an alternate embodiment, the torrefaction is carried out at a temperature in the range of from 200 to 300° C. This is referred to as "roasting". As compared to toasting, roasting requires a greater energy input, and results in a slightly greater loss of material due to volatilization of lignocellulosic material. On the other hand, roasting more severely ruptures the structure of the biomass material.

In a specific embodiment, the solid biomass material comprises water, and the heating is carried out under autogenous pressure. In this case, the heating temperature is limited by the pressure rating of the equipment in which the heating is carried out. In most cases, the heating temperature will have to be below 200° C. It has been found that such heating is very effective in opening the structure of the biomass material.

In this embodiment the accessibility of the solid biomass material can be improved further by precipitously releasing the autogenous pressure. It will be appreciated that this results in a form of solvent explosion.

It is further desirable to carry out at least part of the pretreatment step under pressure. Pressure may be applied by adding a gas, in particular a gas that is oxygen-poor (i.e., having a lower oxygen content than air) or substantially oxygen-free.

In general, both the demineralization step and the step of improving the accessibility of the solid biomass are more effective if the biomass material is present in a small particle size. Particle sizes in the range of from 50 µm to 5 mm are preferred. Grinding biomass to a particle size of significantly less than 5 mm, however, requires an inordinate amount of mechanical energy. It has been found that torrefaction results in a material that is brittle and can be comminuted to a much smaller particle size without requiring large amounts of mechanical energy. For this reason, if torrefaction is one of the pretreatment steps, it is preferred to carry out the pretreatment step on particles having a particle size in the range of from 1 to 50 mm, and to subject the solid biomass material to a further grinding step after the torrefaction step, and before the pyrolysis step.

In general the overall pretreatment is preferably carried out in equipment designed to exert mechanical action on the material, such as a mixer, a mill, a grinder, or a kneader.

The pyrolysis step is preferably carried out in the presence of a catalyst. The catalyst may be a water-soluble material, which may be added to the biomass material either as solid dry particles, or by impregnating the solid biomass material with a solution of the catalytic material. It may seem counterproductive to first remove the minerals from the biomass material and then re-introduce minerals in the form of a dissolved catalytic material. However, demineralization followed by impregnation allows the operator to exercise control over the composition of the minerals present in the biomass, and thereby over the catalytic activity, which is not present if the catalytic activity is governed by the composition of the native minerals.

In another embodiment, the catalyst is water-insoluble. The use of water insoluble catalytic materials offers the advantage of easy separation of the catalyst from the reaction product. It is also possible to use a combination of a water-soluble and a water-insoluble catalyst.

In one embodiment the catalytic material is an acid. Examples of suitable solid acids include zeolites, in particular zeolites-Y, ZSM-5, or a mixture thereof.

In an alternate embodiment the catalyst comprises an alumina, in particular gamma-alumina.

In yet another embodiment the catalyst comprises a solid base. Suitable examples include hydrotalcite; a hydrotalcite-like material; a clay; a layered hydroxy salt; a metal oxide; a metal hydroxide; a mixed metal oxide; or a mixture thereof. The term "hydrotalcite-like material" refers to layered anionic clays having the structure of hydrotalcite, and wherein either all or part of the divalent metal is not Mg; or all or part of the trivalent metal is not Al; or both.

The combination of the partial demineralization of the solid biomass and the pretreatment resulting in improving the accessibility of the solid biomass results in a high liquid yield of the pyrolysis reaction, as well as a high quality of the liquid reaction product.

Prior art flash pyrolysis products are characterized by a high oxygen content of the liquid product, as evidenced by a high total acid number (TAN). The total acid number is defined as the amount of KOH, in milligram, required to neutralize 1 g of the liquid product. Although the number correlates with the oxygen content of the liquid, it is not fully proportional to the oxygen content, as not all oxygenated compounds present in the liquid are acids.

It has been found that the process of the invention can produce bio-oils having a TAN of less than 30, even less than 10, and in some cases even less than 5. This is to be contrasted with prior art processes, which result in liquid pyrolysis products having a TAN of 60 or higher.

In general, it is possible to improve the quality of the bio-oil by sacrificing the liquid yield. With the process of the present invention it is possible to produce a high quality bio-oil (i.e., a bio-oil having a low TAN) at a high yield. Thus, it is possible to balance the yield x (in %) and the TAN y (in mg KOH per g bio-oil) such that the ratio x/y is greater than 1.5. By contrast, prior art processes producing a bio-oil having a TAN of 60 in a liquid yield of 80% (which is considered a very high yield) has an x/y ratio of less than 1.35.

In preferred embodiments the process of the invention produces an x/y ratio of greater than 2, or even greater than 3.

The ability to produce bio-oils having low TAN values offers many advantages. In general, a bio-oil having a TAN of less than 30 can be processed in equipment of stainless steel or even soft steel, whereas prior art pyrolysis oils are corrosive and require to be stored and/or processed in equipment made of special (and expensive) alloys.

Low TAN bio-oils also require less upgrading before being usable as fuel replacements, and consume less hydrogen in the upgrading processes. Such high quality biooils lend themselves for processing in conventional refinery equipment, as they are miscible with refinery streams. As a rule of thumb, a bio-oil can be blended with a refinery stream, such as a gasoil, if the TAN is below 10, and can be blended or processed by itself if the TAN is below 5.

A low TAN bio-oil has the additional advantage that the liquid pyrolysis product spontaneously separates into the bio-oil itself, and an aqueous phase. The aqueous phase contains water-soluble acids produced in the pyrolysis reaction. The aqueous phase lends itself extremely well for use as a solvent in the demineralization step. The aqueous phase is low in mineral content, because of the demineralization step. Minerals that remain in the biomass after the demineralization step tend to form insoluble ashes, which end up as fly ash in the gaseous product stream, and as solids in the solids product stream of the pyrolysis reaction.

By contrast, prior art pyrolysis processes produce single-phase liquid pyrolysis products, from which the aqueous phase does not spontaneously separate. Phase separation may be induced by adding more water, which increases the volumes to be handled, and dilutes the acids present in the aqueous phase.

In a preferred embodiment of the invention, the demineralization step comprises contacting the solid biomass feedstock with the aqueous phase isolated from the liquid pyrolysis product.

Suitably the pyrolysis reaction is carried out in a cyclone reactor, a stationary fluid bed reactor, or a transported bed reactor.

Specific embodiments of the pretreatment process are depicted in the drawing figures. It will be understood that these are by way of example only. Many variations are possible within the scope of the present invention.

FIG. 1 is a schematic representation of a first embodiment of the pretreatment process. Aqueous solvent 111 and biomass particles 112 are introduced into soaking vessel 110. The aqueous solvent preferably contains acids, for example organic acids. Suitably the aqueous phase is a liquid by-product of the pyrolysis reaction. The biomass particles 112 have a particle size in excess of 1 mm, for example in the range of from 1 to 50 mm, preferably 1 to 10 mm. Wood chips and saw dust are examples of suitable biomass particles. The biomass particles are soaked with the aqueous solvent in soaking vessel 110.

The wet biomass material is transferred to filter box 120. Liquid phase 121 is removed from the biomass, for example by gravity, but preferably by mechanical action. In a preferred embodiment, filter box 120 is a filter press.

From filter box 120 the partially dewatered biomass 122 is transferred to grinder 130. Optionally catalyst particles 132 are added at this stage. Optionally catalyst particles 132 are hot so as to provide drying and/or heat treatment of the biomass particles. It is not intended that the biomass particles are converted to liquid or gaseous products at this stage. The ratio of biomass particles 122 and catalyst particles 132, and the temperature of catalyst particles 132, are chosen so as to produce a temperature in the range of from 90 to 200° C. in grinder 130.

Grinder 130 can be any device suitable for reducing the particle size of the biomass material and, if catalyst particles 132 are present, providing intimate contact between the biomass particles and the catalyst particles. Suitable examples of grinder 130 include ball mills, kneaders, planetary mills, and the like. In a particularly preferred embodiment grinder 130 is a fluidized bed wherein collisions between the biomass particles and the catalyst particles effect the desired reduction of the biomass particle size.

Biomass particles 131 leaving grinder 130 generally have a mean particle size of less than 300 µm.

Figure 2:
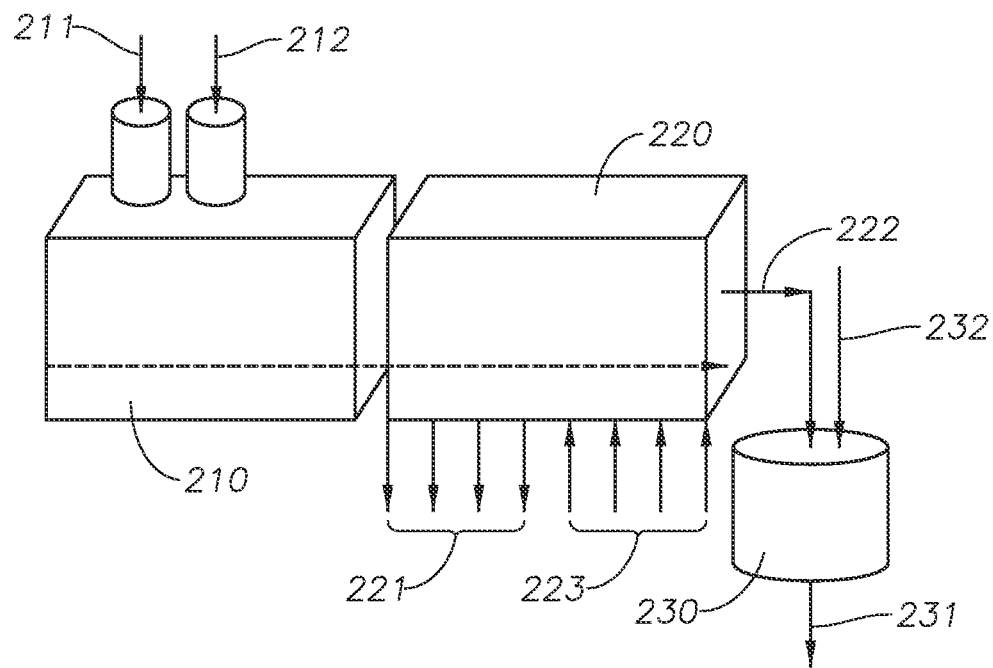
FIG. 2 is a schematic representation of a second embodiment of the process of the present invention.

In the embodiment of FIG. 2, biomass particles 212 and aqueous solvent 211 are mixed in soaking vessel 210. Swollen biomass is transferred to filter box 220, which comprises two stages. In the first stage aqueous solvent 221 is removed from the swollen biomass. In the second stage hot gas 223 is introduced into filter box 220. Hot gas 223 preferably is a by-product of the pyrolysis product, such as flue gas from a catalyst regenerator, or steam produced with excess heat recovered from the catalyst regenerator, for example in a catalyst cooler. Hot gas 223 serves to provide drying and/or heat treatment of the biomass.

Biomass particles 222 are transferred to grinder 230, where they are optionally mixed with catalyst particles 232, to produce ground biomass particles 231.

Figure 3:
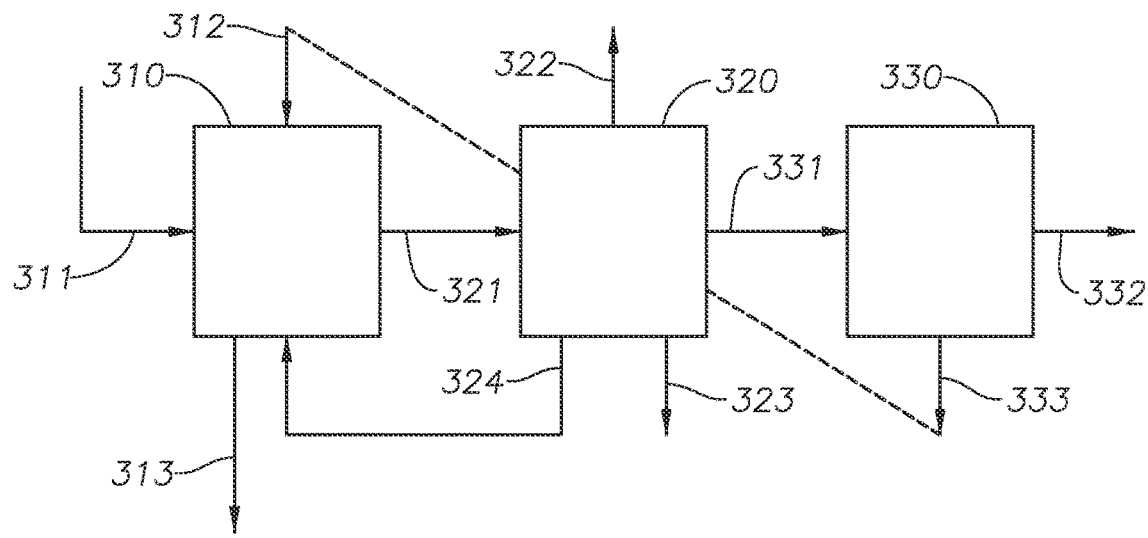
FIG. 3 is a flow diagram of one embodiment of the process of the invention, in particular suitable for the conversion of biomass having low minerals content.

Referring to FIG. 3, a flow chart is shown of an embodiment of the process of the invention that is particularly suitable for the conversion of solid biomass materials having a low mineral content.

Block 310 represents the pretreatment step. Biomass stream 311 is fed into pretreatment step 310. The biomass feed 311 has a low mineral content, for example less than 2 wt %. The pretreatment step may comprise swelling/dewatering; mechanical action; heating; and/or solvent explosion, as described hereinabove. Stream 312 is aqueous phase recycled from phase separation block 330.

The embodiment shown comprises the optional swelling/dewatering treatment. Water stream 313 contains any minerals removed from the biomass. Stream 313 may be combined with stream 323, or may be upgraded separately.

Activated biomass 321 is transferred to pyrolysis/regeneration block 320, where it is contacted with a hot particulate catalyst stream (not shown, as it is generated within the pyrolysis/regeneration block). Both the pyrolysis and the regeneration produce gaseous products. For the regeneration part the flue gas consists primarily of $CO_2$. The pyrolysis gas comprises gases having a reducing potential, such as CO, $CH_4$, and $H_2$. These gases may be recycled into the pyrolysis reactor so as to further reduce the oxygen content of the liquid pyrolysis product.

The regeneration produces hot catalyst particles, which are fed back into the pyrolysis reactor. Part of the hot catalyst stream may be cooled off and recycled to pretreatment block 310 as a "cold" (temperature below 300° C.) catalyst stream 324. The regenerator further produces ash and minerals stream 323, which may be used for fertilizer.

The pyrolysis/regeneration process may produce excess heat, which can be recycled to the pretreatment block 310, for example via "cold" catalyst stream 324, or as steam (not shown).

Liquid reaction product 331 is transferred to phase separation block 330. Due to the good quality (low oxygen content) of the liquid pyrolysis product, phase separation may occur spontaneously, requiring only a skim tank for recovering the aqueous phase and the organophilic phase. The water content of the organophilic phase may be reduced further by adding de-emulsifiers, and/or applying mechanical action, such as centrifugation.

Aqueous phase 333 is recycled at least in part to pretreatment 310.

Figure 4:
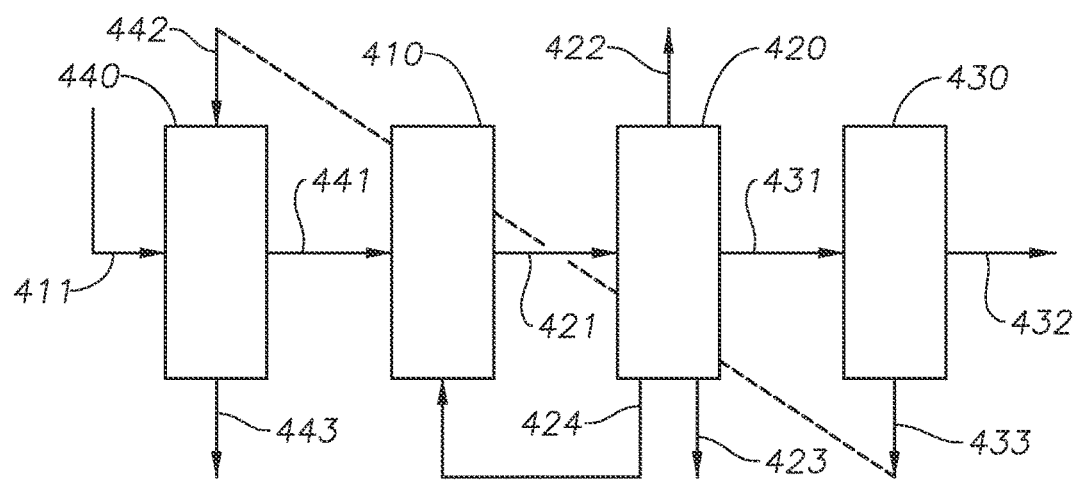
FIG. 4 is a flow diagram of one embodiment of the process of the invention, in particular suitable for the conversion of biomass having high minerals content.

FIG. 4 shows the block diagram of an alternate embodiment of the process, particularly suitable for solid biomass having a high mineral content.

Solid biomass 411 is fed into demineralization block 440, where it is mixed with aqueous phase 442 from phase separation block 430. The demineralization comprises swelling the solid biomass with aqueous phase 442, and dewatering the swollen biomass material. The swelling/dewatering treatment may be repeated once or several times.

Demineralized biomass 441 is fed into pretreatment block 410, where it is subjected to a combination of mechanical action; heating; and/or solvent explosion, optionally in the presence of "cold" catalyst 424 from pyrolysis/regeneration block 420.

Pretreated biomass 421 is fed into pyrolysis/regeneration block 420. Emanating from pyrolysis/regeneration block 420 are flue gas 422, ash/mineral stream 423, and (optionally) cold catalyst 424. As in the first embodiment, excess heat from pyrolysis/regeneration block 420 may be recycled to pretreatment block 410, as "cold" catalyst 424, or as steam (not shown).

The pyrolysis liquid 431 is separated into an oil phase 432 and an aqueous phase 433, the latter being recycled to demineralization block 440.

What is claimed is:

1. A process for converting a solid biomass material comprising minerals to a high quality bio-oil in high yield, said process comprising:
   (a) contacting said solid biomass with a solvent so as to dissolve at least part of the minerals present in said solid biomass, wherein said solvent comprises a phosphoric acid;
   (b) at least partially removing said solvent from said solid biomass via a liquid/solid separation method to form a demineralized biomass;
   (c) subjecting said demineralized biomass to a pretreatment step, wherein said pretreatment step comprises improving the accessibility of said demineralized biomass by opening the texture of the particles of said demineralized biomass, wherein said improving comprises heating said demineralized biomass to a temperature in the range of from 90 to 300° C. in an oxygen-free atmosphere to form a pretreated solid biomass; and
   (d) subjecting at least a portion of said pretreated solid biomass to a pyrolysis step in a pyrolysis reactor and in the presence of a regenerated catalyst to produce a bio-oil having a Total Acid Number (TAN) of less than 30 and a used catalyst, wherein said bio-oil has a TAN of y and a yield of x, such that the ratio x/y is greater than 1.5; and
   (e) regenerating said used catalyst in a regenerator to produce a flue gas and said regenerated catalyst.

2. The process of claim 1 wherein said solid biomass comprises cellulose.

3. The process of claim 2 wherein said solid biomass is a lignocellulosic biomass material.

4. The process of claim 1 wherein said solvent comprises a chelant.

5. The process of claim 1 wherein said temperature is in the range of from 110 to 200° C.

6. The process of claim 1 wherein said temperature is in the range of from 200 to 300° C.

7. The process of claim 1 wherein said regenerated catalyst is water-insoluble.

8. The process of claim 1 wherein said regenerated catalyst comprises an acid.

9. The process of claim 1 wherein said regenerated catalyst comprises a zeolite.

10. The process of claim 9 wherein said regenerated catalyst comprises a Y-zeolite, a ZSM-5 zeolite, or a mixture thereof.

11. The process of claim 1 wherein said regenerated catalyst comprises alumina.

12. The process of claim 11 wherein said alumina comprises gamma-alumina.

13. The process of claim 1 wherein said regenerated catalyst comprises a solid base.

14. The process of claim 13 wherein said regenerated catalyst comprises hydrotalcite; a hydrotalcite-like material; a clay; a layered hydroxy salt; a metal oxide; a metal hydroxide; a mixed metal oxide; or a mixture thereof.

15. The process of claim 1 wherein said bio-oil has a TAN of less than 5.

16. The process of claim 1 wherein said ratio x/y is greater than 2.

17. The process of claim 1 wherein said ratio x/y is greater than 3.

18. The process of claim 1 wherein the pretreatment step is carried out in a mixer, a mill, a grinder, or a kneader.

19. The process of claim 1 wherein the pyrolysis reactor comprises a fluid bed reactor, a moving bed reactor, or a cyclone reactor.

20. The process of claim 1 wherein said pyrolysis step produces gases having a reducing potential, further comprising using said gases in said pyrolysis step to thereby reduce the oxygen content of said bio-oil.

21. The process of claim 1 further comprising recycling the excess heat from said pyrolysis step to said pretreatment step.

22. The process of claim 1 further comprising recycling the flue gas from said regenerator to said pretreatment step.

23. The process of claim 1 wherein said liquid/solid separation method comprises filtering.

24. The process of claim 1 wherein said contacting of step (a) occurs at a temperature in the range of 40 to 95° C.

25. The process of claim 1 further comprising separating said bio-oil into an aqueous phase and an organophilic phase in a skim tank.

* * * * *